United States Patent [19]

Moe

[11] Patent Number: 4,947,462
[45] Date of Patent: Aug. 7, 1990

[54] INDUCTION WELDING APPARATUS AND METHOD

[76] Inventor: Per H. Moe, Amtmann Bangsgt. 7, Drammen, Norway, N-3000

[21] Appl. No.: 249,549

[22] Filed: Aug. 26, 1988

Related U.S. Application Data

[63] Continuation of Ser. No. PCT/No 87/00067 Oct. 22, 1987.

[30] Foreign Application Priority Data

Nov. 20, 1986 [NO] Norway ................................. 864655

[51] Int. Cl.$^5$ ............................................. H05B 6/10
[52] U.S. Cl. .................................... 219/8.5; 219/9.5; 219/10.43; 219/10.79
[58] Field of Search ...................... 219/9.5, 8.5, 10.43, 219/10.79, 10.57, 10.75

[56] References Cited

U.S. PATENT DOCUMENTS

| | | | |
|---|---|---|---|
| 1,915,047 | 6/1933 | Blakeslee | 219/9.5 |
| 2,021,157 | 11/1935 | Stahl | 219/10 |
| 2,066,668 | 1/1937 | Bennett | 219/11 |
| 2,542,393 | 2/1951 | Chapman | 219/6 |
| 2,629,805 | 2/1953 | Body | 219/10 |
| 2,805,315 | 9/1957 | Chapman | 219/67 |
| 2,805,316 | 9/1957 | Chapman | 219/9.5 |
| 2,862,092 | 11/1958 | Cowan | 219/9.5 |
| 2,892,914 | 6/1959 | Rudd | 219/9.5 |
| 3,007,022 | 10/1961 | Jackson et al. | 219/9.5 |
| 3,031,554 | 4/1962 | Jackson | 219/9.5 |
| 3,178,549 | 4/1965 | Stein | 219/9.5 |
| 3,248,512 | 4/1966 | Sommer | 219/8.5 |
| 3,311,732 | 3/1967 | Stein et al. | 219/9.5 |
| 3,397,295 | 8/1968 | Hale | 219/9.5 |
| 4,093,839 | 6/1978 | Moliterno et al. | 219/8.5 |
| 4,241,284 | 12/1980 | Rudd et al. | 219/61.2 |
| 4,300,031 | 11/1981 | Reboux et al. | 219/9.5 X |
| 4,694,134 | 9/1987 | Ross | 219/10.79 |
| 4,736,084 | 4/1988 | Moe | 219/8.5 X |

FOREIGN PATENT DOCUMENTS 2001891 2/1979 United Kingdom .

Primary Examiner—Philip H. Leung
Attorney, Agent, or Firm—Darby & Darby

[57] ABSTRACT

Arrangement in connection with induction butt-welding of the aubstantially pipe- or bolt-shaped elements of metal, which are provided close to each other along substantially the same center axis, and which at their welding edges define a narrow gap or joint which are kept approximately constant during the heating phase. For the purpose of achieving an electromagnetic field which can be guided into the area of the joint for rendering a concentrated heating area at the welding edges, a combination of a coil provided around the narrow gap and adapted for being subjected to a voltage in the frequency range of approximately 50–5000 Hz, and a cover of ferro-magnetic material provided around the coil and serving to guide the electromagnetic field to the area of the welding joint.

10 Claims, 2 Drawing Sheets

INDUCTION WELDING APPARATUS AND METHOD

This is a continuation of application Ser. No. PCT/N087/00067, filed Oct. 22, 1987.

BACKGROUND OF THE INVENTION

The present invention relates to an arrangement for induction heating, especially for butt-welding of two primarily pipe- or bolt-shaped elements of metal which are arranged close to each other along substantially the same center axis, and which at their welding edges define a narrow gap or joint which is kept approximately constant during the heating phase.

In connection with butt-welding of pipe- or rod-shaped members of metal, there are previously suggested high frequency resistance heating as well as induction heating.

A special embodiment of resistance heating is disclosed in Norwegian patent application No. 850049, and in practice this has proved effective and appropriate in connection with the welding of pipe elements having a diameter up to 16″. What is required is a high frequency generator having a power of approximately 300 kV and a frequency of about 20.000 Hz. Larger pipe diameters, for example in the range 42″ and pipe thicknesses of $1-1\frac{1}{4}''$ will however require a high frequency generator of approximately 800 kV. In connection with larger, continuous welding operations, for example when welding together pipe elements to long pipe lines, it will be required to have an extra high frequency generator serving as a stand-in in case the one generator should fail or must be repaired. Such high frequency generators are very expensive and will accordingly substantiate the main investment in a high frequency resistance welding system.

Further, from Norwegian patent application 833729 there is known a method for joining parts of metal by forge welding, wherein the parts prior to the forge welding is heated by means of an induction coil. Due to rational joint welding, it is of great importance that the heating is concentrated as much as possible in the area of the joint. If the heat is allowed to spread too far from the joint, the heating time will increase, the bending force of the parts will be reduced during he forge welding, the favorable tri-axial stress condition will be reduced, and the necessity of heat treatment after the completed welding will increase.

SUMMARY OF THE INVENTION

The object of the present invention is to provide an arrangement for butt-welding of pipes, which is based upon induction heating, and which is far cheaper to provide than installations comprising expensive high frequency generators. At the same time it is aimed at an arrangement in connection with induction heating which is not suffering from the disadvantages included in previous systems using induction heating, for example by having the induction coil arranged so close to the joint that the heating will take place only therein something which is important for achieving a concentrated heating zone in the area of the joint.

The object is according to the present invention achieved in an arrangement which according to the invention is characterized by a combination of a coil which is provided around the narrow and which is adapted for being subjected to a voltage, in the frequency range of approximately 50–5000 Hz, and a cover of ferro-magnetic material arranged around the coil and serving to guide the electro-magnetic field to the area of the welding joint.

In such an arrangement, the induction coil can be connected to an ordinary supply network having a voltage in the frequency range of 50–60 Hz. Possibly, the induction coil can be connected to an alternating current generator giving a voltage in the frequency range of 50–5000 Hz, which can be favorable on board a vessel or an off-shore structure, in which the alternating current generator can be driven by an auxiliary motor, especially a generator/ diesel unit.

Appropriately, the magnetic cover may comprise a plurality of substantially U-shaped single sheet metals provided in a ring around the low/medium frequency coil. The induction coil can then be placed in the U-shaped space between the sheet metals without necessarily being in close proximity to the joint area, the electro-magnetic field following the U-shaped single sheet metals which in turn can be provided closely around the joint area in the shape of two semi-circles which are hinged together for being opened and closed around the coil and said joint.

Additionally, the magnetic cover at the areas being closest to the elements to be joined and the intermediate narrow gap can be provided with a sealing lip for during use to encircle the gap area together with other sealing means, for thereby defining a space which can be flushed with reducing gas during the heating.

BRIEF DESCRIPTION OF THE DRAWINGS

In the following the invention will be further described, reference being had to the drawing which diagrammatically illustrates embodiments of the arrangement according to the invention.

DESCRIPTION OF THE PREFERRED EMBODIMENTS

Figure 1:
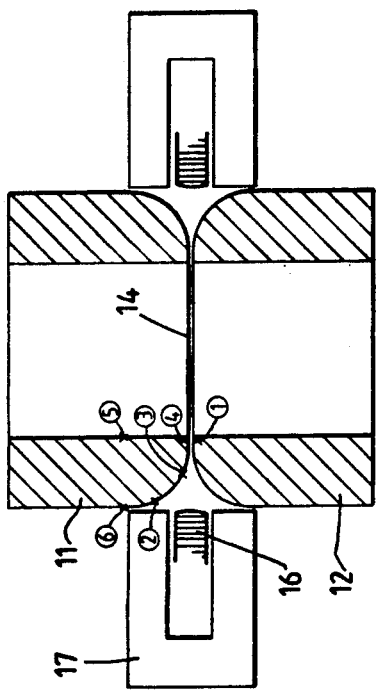
FIG. 1 is a diagrammatical section through an embodiment of an arrangement according to the invention.
Figure 3:
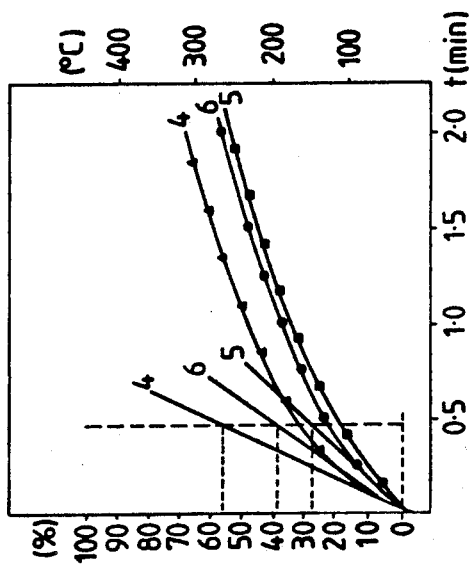
FIG. 2 and FIG. 3 are graphical charts illustrating the development of power at various points in the joint during the heating phase.
Figure 2:
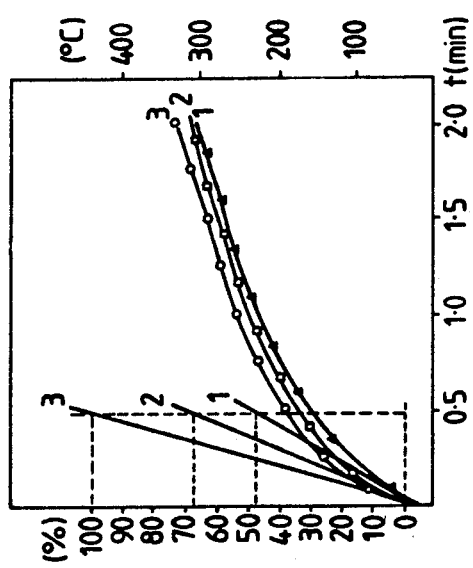

In FIG. 1 there is illustrated two pipe parts 11 and 12 which are so positioned relative to each other that a gap 13 is established therebetween. The gap is defined by gap surfaces 14 and 15 on the individual pipe parts 11 and 12, respectively.

Around the area of the gap 13 there is provided an induction coil 16 which can be connected to a not illustrated supply network having a voltage in the frequency range 50–60 Hz. Possibly, the coil 16 can be connected to an alternating current generator supplying a voltage in the frequency range 50–5000 Hz.

Around the induction coil 16 there is provided a cover 17 of ferro magnetic material serving to guide the electro-magnetic field to the area of the welding gap 13.

The magnetic cover 17 appropriately comprises a plurality of substantially U-shaped single sheet metals arranged in a ring around the low frequency coil 16.

Figure 4:
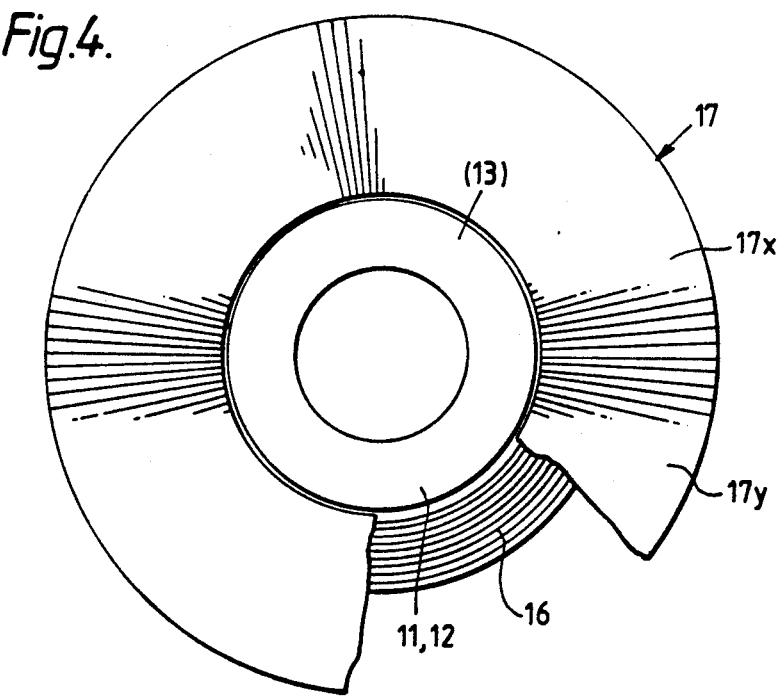
FIG. 4 is a top view of the arrangement shown in FIG. 1.

Appropriately, the U-shaped single sheet metals are provided in two semi-circles being linked together for being opened and closed around the coil, as this appears from FIG. 4.

Figure 5:
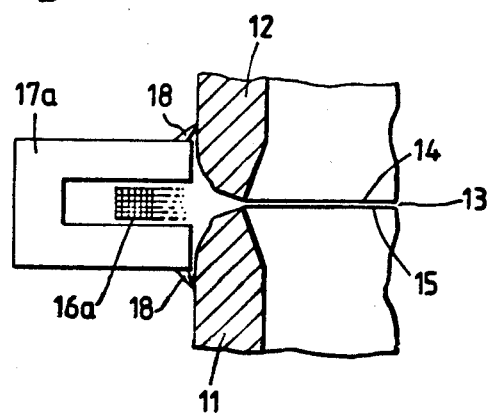
FIG. 5 is on a larger scale a diagrammatical segment of a variant of the arrangement according to the invention.

In FIG. 5 there is illustrated an alternative embodiment of the arrangement according to the invention, the cover 17a here being provided with a sealing lip 18 serving to define a space around the joint and together with other sealing means rendering access for through flushing by a reducing gas through the gap 13 during the heating.

The induction coil 16a may here comprise from 1 to 40 turns, preferably 5–10 turns, said turns being provided in parallel connection around the joint or the gap 13. Appropriately, the turns may have a hollow cross section for the cooling thereof, for example by means of water.

The welding edges are at the narrow gap 13 provided with inclined surfaces, preferably for the forming of an inner V-shape.

Although the material's cross section is reduced in the joint area for thereby achieving high tri-axial tensions during forging, it is not determining that the induction coil 16a is located in close proximity to the joint during the heating phase. This is so because the magnetic cover 17a contributes in guiding the electro-magnetic field to the area of the welding edges, so that the heat is developed therein without being spread too much to the sides.

In the following there will be given an example of how a low frequency induction heating according to the invention may function in practice.

Low frequency induction.

It is presumed that a distinction is apparent in case it is not practical to use coils having only one turn. The inductive resistance is frequency dependent, and the over all resistance
$$Z = (R^2 + \omega^2 \cdot L^2)^{0.5}$$
In order to avoid a too extreme current strength involving large ohmic losses by reducing f, there are used several turns. L increases proportionally with the number of turns n to the second power, wherein k is a proportional constant and D designates the diameter of the coil:
$$L = K \cdot D \cdot N^2$$
The magnetic field strength round a coil is given by turns · amp in the coil, and it is therefore possible to compensate a lower electric current with many turns. However, the cooling water for a coil having many turns will create design problems. Eddy currents in turns which are unfavorable located, will create large ohmic losses.

By low frequencies, for example 50–60 Hz, the penetration depth is several centimeters. Thus, a low frequency coil will heat a pipe wall around the joint in an unacceptable length as regards bending. The same phenomenon renders a slow heating, since large masses are to be heated.

This can be compensated by giving the coil a magnetic cover of ferro-magnetic sheet metal, and designing the joint with an inner V-shape. The field is guided into the joint and the largest field intensity is developed where the heating is wanted, from the middle of the joint and declining to the sides.

Practical testing of low frequency induction have been performed with coil, iron sheet metal and pipe as illustrated in FIG. 1.

The test was made two times with somewhat different current and voltage, and the results can be repeated. Larger power in the second experiment illustrated far more explicit that the induced current in the pipe is largest where the magnetic field is most strongly concentrated.

For the sake of simplicity the coil has not been cooled and develops considerable heat. Measured temperature in coil and sheet metal core is 180 and 60°, respectively, from the starting point 20° C.

Specific ohmic resistance: 0.0175–0.0285, mean 0.0230 ohm/ mm²/m.

Coil diameter: average 150 mm.
Number of turns: 40
Cross section: 0.7·10 mm
Developed ohmic power: $I^2 \cdot R$.

In the following an experiment will be analyzed.

Measured voltage: 88–91 V giving 89.5 V as an average

Measured current: 164–136 A giving 150 A as an average

Impedance: $Z = U/I = 89.5/150 = 0.60$ ohm
Ohmic resistance: $0.023 \cdot 40 \cdot \pi \cdot 0.15/0.7 \cdot 10 = 0.062$ ohm
For flat coils: $K = \pi^2$
Reactance without coupling to iron core:
$X = \omega \cdot L = 2\pi \ 50 \cdot \pi^2 \cdot 0.15 \cdot 40^2 \cdot 10^{-7} = 0.075$ ohm
Impedance by the connection in question:
$Z = (R^2 + X^2)^{0.5}$
$X = (0.60^2 - 0.062^2)^{0.5} = 0.598$ The sheet metal cover renders $0.598/0.075 \sim 8$ times better connection between coil and pipe than only air.

Simplified calculations of inductance for the configuration coil-pipe indicates that $\cos\phi \sim 0.65$.

The temperature elevation in the core indicates that the losses in the core is equal to 50% of ohmic loss in the coil.

Total active power:
$P_{tot} = U \cdot I \cdot \cos\phi = 89.5 \cdot 150 \cdot 0.65 = 8.7$ kW
Loss in core and coil:
$P_{tap} \sim 1.5 \cdot R \cdot I^2 = 1.5 \cdot 0.062 \cdot 150^2 = 2.1$ kW
Supplied power to the steel pipe:
$P_n = 8.7 - 2.1 = 6.6$ kW
Efficiency for coil:
$\eta = 6.6/8.7 = 75\%$ From the measurements it maybe assumed for the sake of simplicity that a zone of 16 cm width has been heated in two minutes as an average.

"Theoretical" temperature increase: Energy/weight·specific heat
$6600 \cdot 120/\pi \cdot (5^2 - 2.8^2) \cdot 16 \cdot 7.8 \cdot 0.1 \cdot 4.2) = 280°$ C.

Highest measured temperature is 300° .C in the middle of the joint and the average as such 200° C.

It is also interesting to observe a theoretic heat zone being a consequence of low frequency induction.

Theoretically it may be assured that the overall heat is developed between the point 3 and 4, which is somewhat simplified. The most interesting part of the heat zone creating bending problems, is between 600° and 1200° C.

By using 30 W/m ·°C. as a heat conducting number for austenittic iron and heat conductance as only source of loss, calculations can be made for the length of the heating zone for various powers.

For pipes $\phi 100 \cdot 22$ mm an appropriate power may be 40 kW for high frequency induction, which is most simply to compare with. With a 50% contraction in the joint the thickness of the joint will on an average be 16 mm. Constant ratios will be achieved at the moment where the discharge of heat is equal to the supply.

Supplied heat = discharged heat = thermal gradient · thermal conductance coefficient · area · 2

Thermal gradient = (1200−600)/50% bending length $$\eta \cdot P = \frac{\Delta t}{0.51} \cdot k \cdot A \cdot 2$$

$$l = \frac{4 \cdot \Delta t \cdot k \cdot A}{\eta \cdot p}$$

$$l = \frac{4 \cdot 600 \cdot 30 \cdot \pi(0.048^2 - 0.032^2)}{0.65 \cdot 40.000} = 0.011 \text{ m} = 11 \text{ mm}$$

The example illustrates how important it is to provide a heating in the joint rather than from the outside. The heating zone would have been continually 1200° C. in 30–40 mm before the inside is heated sufficiently by high frequency induction.

I claim:

1. A combination of an induction welding apparatus and elements to be joined after heating to form a work piece, comprising:

a pair of elements to be joined, said elements being one of pipe-shaped and rod-shaped, said pair of elements opposing one another with their longitudinal axes being colinear, a narrow gap separating said elements in a fixed relationship. each said element tapering in cross section toward said gap and said longitudinal axes, the space between said two elements being approximately V-shaped when said two elements are opposed, the apex of said V being directed toward the common axis of said elements;

a coil encircling the open narrow gap and spaced therefrom, said coil being adapted for direct connection to a voltage at a frequency in the range of 50 to 60 Hz;

a cover of ferro-magnetic material provided around said coil for guiding the electro-magnetic field created by said coil to the area of said gap, induced currents in said elements being concentrated in said reduced cross section areas, said opposed elements being rapidly heated at said gap when said voltage is applied.

2. A combination as claimed in claim 2, wherein said coil includes a plurality of turns, said plurality being in a range of 5 to 10 turns, said turns being arranged in parallel connected sets encircling said gap.

3. A combination as claimed in claim 2, wherein said turns have a hollow cross section for circulation therethrough of coolant.

4. A combination as claimed in claim 2, wherein said coil includes turns having a hollow cross section for the cooling thereof by circulation of coolant through said hollow cross section.

5. A combination as claimed in claim 1, wherein said cover includes a plurality of substantially U-shaped single sheet metal plates arranged in a ring around said coil and spaced therefrom.

6. A combination as claimed in claim 5, wherein said U-shaped single sheet metal pates are provided in two semi-circles, said semi-circles being hinged together for opening and closing around said coil.

7. A combination as claimed in claim 1, and further comprising sealing lips, said lips encircling said elements on both sides of said gap, said lips spanning the distance between said cover and said elements, a gas tight space being created by said lips between said cover and said elements, said space being suited for circulation therethrough of reducing gas during heating and welding operations.

8. Arrangement in connection with induction butt-welding of pipe- or bolt-shaped elements of metal which are provided close to each other along substantially the same center axis, and which at their welding edges define a narrow, open gap or joint which is kept approximately constant during the heating phase, the narrow gap being closed in one operation by butt-welding of the welding edges heated to welding temperature, characterized by the following combination of features:

(a) a coil provided around the open, but narrow gap and adapted for being subjected to a voltage direct from a net frequency in the frequency range 50–1000 Hz;

(b) a cover of ferro-magnetic material provided around said coil and comprising a plurality of substantially U-shaped single sheet metals arranged in a ring around said coil for guiding the electro-magnetic field to the area of the welding edges constituting the narrow, open welding gap;

(c) a reduced material cross section in the gap area taking the shape of for example inclined welding surfaces and being formed with approximate V-shape having its narrow end directed inwardly;

(d) there being thereby achieved an induced current concentrated to the reduced, stationary welding surfaces for bringing these rapidly to the wanted welding temperature.

9. A method of induction welding together of separate elements, said elements being one of pipe-shaped and rod-shaped, comprising the steps:

tapering the ends of the elements to be joined;

positioning said elements with their longitudinal axes colinear and said tapered ends opposing one another with a small gap therebetween;

encircling said gap with an induction coil, said coil being spaced from said gap;

encircling said coil with a magnetic flux concentrator, said concentrator surrounding said coil and said gap and extending in close proximity to said elements;

applying an AC voltage having a frequency in the range of 50 to 1000 Hz, to said induction coil, said AC voltage in said coil generating a magnetic flux causing said elements to heat adjacent said gap;

pressing said elements together to close said gap after said elements are heated to the desired temperature at said gap.

10. A method as claimed in claim 9, wherein said AC voltage is applied in the range of frequencies from 50 to 60 Hz.

* * * * *